United States Patent
Jung et al.

(10) Patent No.: US 8,954,015 B2
(45) Date of Patent: Feb. 10, 2015

(54) METHOD AND DEVICE FOR PERFORMING LOGGED MEASUREMENT IN WIRELESS COMMUNICATION SYSTEM

(75) Inventors: Sung Hoon Jung, Gyeongki-do (KR); Sung Duck Chun, Gyeongki-do (KR); Seung June Yi, Gyeongki-do (KR); Young Dae Lee, Gyeongki-do (KR); Sung Jun Park, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 13/876,213

(22) PCT Filed: Sep. 28, 2011

(86) PCT No.: PCT/KR2011/007118
§ 371 (c)(1),
(2), (4) Date: Mar. 27, 2013

(87) PCT Pub. No.: WO2012/044047
PCT Pub. Date: Apr. 5, 2012

(65) Prior Publication Data
US 2013/0183908 A1    Jul. 18, 2013

Related U.S. Application Data

(60) Provisional application No. 61/388,569, filed on Sep. 30, 2010.

(51) Int. Cl.
*H04B 17/00* (2006.01)
*H04W 24/02* (2009.01)
*H04W 24/10* (2009.01)
*H04W 28/04* (2009.01)
*H04W 28/18* (2009.01)

(52) U.S. Cl.
CPC ............. *H04W 24/02* (2013.01); *H04W 24/10* (2013.01); *H04W 28/04* (2013.01); *H04W 28/18* (2013.01)
USPC ...................................... 455/67.11

(58) Field of Classification Search
USPC ............................ 455/423, 425, 67.11, 67.13
See application file for complete search history.

(56) References Cited

U.S. PATENT DOCUMENTS

| 2010/0014429 A1 | 1/2010 | Kim et al. |
| 2011/0081868 A1 | 4/2011 | Kim et al. |
| 2011/0201324 A1* | 8/2011 | Persson et al. ............. 455/422.1 |

FOREIGN PATENT DOCUMENTS

| KR | 10-2008-0066561 A | 7/2008 |
| KR | 10-2009-0016291 A | 2/2009 |
| KR | 10-2009-0055942 A | 6/2009 |
| KR | 10-2010-0100017 A | 9/2010 |

OTHER PUBLICATIONS

International Search Report issued in corresponding International Patent Application No. PCT/KR2011/007118 dated Apr. 24, 2012.

* cited by examiner

*Primary Examiner* — Nguyen Vo
(74) *Attorney, Agent, or Firm* — Morgan, Lewis & Bockius LLP

(57) ABSTRACT

A method of performing a logged measurement in a wireless communication system is provided. The method includes: receiving by a user equipment a measurement configuration from a network, wherein the measurement configuration includes a logging interval; detecting by the user equipment a mobility state of the user equipment; adjusting by the user equipment the logging interval on the basis of the detected mobility state; and logging by the user equipment a measurement by using the adjusted logging interval.

14 Claims, 13 Drawing Sheets

METHOD AND DEVICE FOR PERFORMING LOGGED MEASUREMENT IN WIRELESS COMMUNICATION SYSTEM

TECHNICAL FIELD

The present invention relates to wireless communications, and more particularly, to a method of performing a logged measurement in a wireless communication system and an apparatus supporting the method.

BACKGROUND ART $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Minimization of driving tests (MDT) is performed by venders for coverage optimization by using a user equipment (UE) instead of using an automobile. The coverage varies depending on a location of a base station (BS), deployment of buildings nearby, a user's usage environment, etc. Therefore, it is required for the vender to periodically perform the driving test, and a lot of costs and resources are consumed. The MDT is used by the vender to optimize a network by using the UE.

The MDT can be classified into a logged MDT and an immediate MDT. According to the logged MDT, after performing the MDT measurement, the UE delivers a logged measurement to a network at a particular time. According to the immediate MDT, after performing the MDT measurement, the UE delivers the measurement to the network when a reporting condition is satisfied. The logged MDT performs the MDT measurement in a radio resource control (RRC) idle mode, and the immediate MDT performs the MDT measurement in an RRC connected mode.

The vender can gather MDT measurements received from several UEs to create a coverage map which shows distribution of quality of service and service availability across an overall area in which the vender provides a service, and thus can utilize the coverage map for a network operation and optimization. For example, when a coverage problem of a specific area is reported from the UE, the vender can increase transmit power of the BS which provides a service of the area to expand coverage of a corresponding cell.

In the logged measurement, a granularity of the coverage map depends on a mobility of the UE. Since the mobility of the UE may change while the UE is on the move, the granularity of the coverage map may have a different value depending on a location. Due to an excessively high mobility of the UE, a coverage hole may occur if the granularity of the coverage map is significantly low in a specific location, which results in deterioration of efficiency of the coverage map. Accordingly, there is a need to provide a logged measurement method considering the mobility of the UE.

SUMMARY OF INVENTION

Technical Problem

The present invention provides a method of performing a logged measurement in a wireless communication system and an apparatus supporting the method.

Technical Solution

According to an aspect of the present invention, a method of performing a logged measurement in a wireless communication system is provided. The method includes: receiving by a user equipment a measurement configuration from a network, wherein the measurement configuration includes a logging interval; detecting by the user equipment a mobility state of the user equipment; adjusting by the user equipment the logging interval on the basis of the detected mobility state; and logging by the user equipment a measurement by using the adjusted logging interval.

In the aforementioned aspect of the present invention, the measurement configuration further may include at least one scaling parameter corresponding to the mobility state.

In addition, the adjusting of the logging interval may include, if the mobility state is changed, determining the adjusted logging interval to a value obtained by multiplying the logging interval by the scaling parameter corresponding to the detected mobility state.

In addition, the measurement configuration may further include at least one new logging interval corresponding to the mobility state.

In addition, the adjusting of the logging interval may include, if the mobility state is changed, determining the adjusted logging interval to a new logging interval corresponding to the detected mobility state.

In addition, the measurement configuration may further include a reference logging distance used as a criterion for adjusting the logging interval.

In addition, the detecting of the mobility state of the user equipment may include acquiring information on a movement speed of the user equipment.

In addition, the adjusting of the logging interval may include determining the adjusted logging interval to a value obtained by dividing the reference logging distance by the movement speed of the user equipment.

In addition, the method may further include: receiving a report request of the logged measurement by the user equipment from the network; and transmitting a measurement result including the logged measurement by the user equipment to the network in response to the report request.

According to another aspect of the present invention, a wireless apparatus performing a logged measurement in a wireless communication system is provided. The apparatus includes: a radio frequency (RF) unit for transmitting and receiving a radio signal; and a processor coupled to the RF unit, wherein the processor is configured for: receiving a measurement configuration from a base station, wherein the measurement configuration includes a logging interval; detecting a mobility state of the user equipment; adjusting the logging interval on the basis of the detected mobility state; and logging a measurement by using the adjusted logging interval.

In the aforementioned aspect of the present invention, the measurement configuration may further include: at least one scaling parameter corresponding to the mobility state, and wherein the adjusting of the logging interval comprises, if the mobility state is changed, determining the adjusted logging interval to a value obtained by multiplying the logging interval by the scaling parameter corresponding to the detected mobility state.

In addition, the measurement configuration may further include at least one new logging interval corresponding to the mobility state, and the adjusting of the logging interval may include, if the mobility state is changed, determining the adjusted logging interval to a new logging interval corresponding to the detected mobility state.

In addition, the measurement configuration may further include a reference logging distance used as a criterion for adjusting the logging interval.

In addition, the detecting of the mobility state of the user equipment may include acquiring information on a movement speed of the user equipment, and the adjusting of the logging interval may include determining the adjusted logging interval to a value obtained by dividing the reference logging distance by the movement speed of the user equipment.

Advantageous Effects

A logged measurement method according to an exemplary embodiment of the present invention is a method capable of adjusting a logging interval depending on a mobility of a user equipment (UE). The UE can selectively adjust the logging interval depending on a mobility change by detecting its mobility. In this manner, a coverage map having a good granularity can be obtained. Further, it is possible to avoid a problem in that a coverage hole is generated due to an increase in the mobility.

MODE FOR INVENTION

Figure 1:
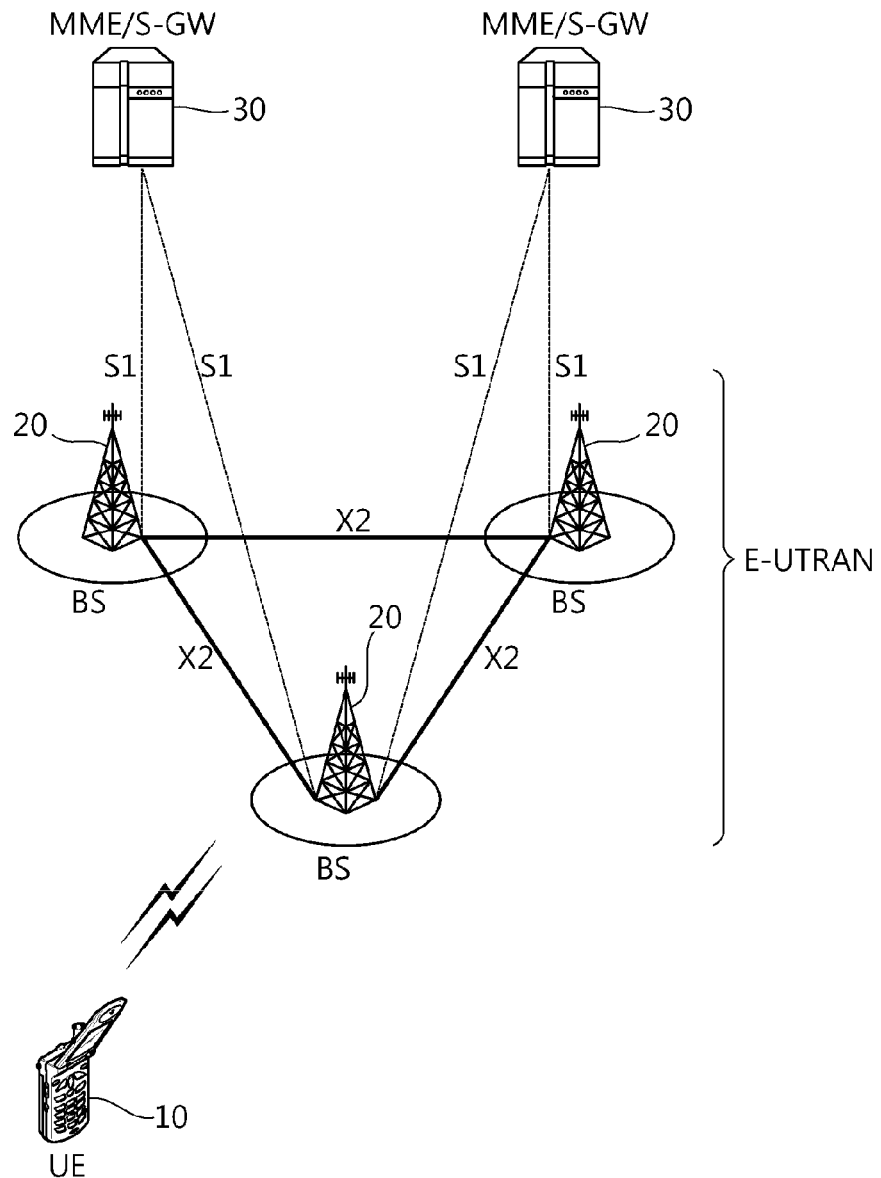
FIG. 1 shows a wireless communication system to which the present invention is applicable.

FIG. 1 shows a wireless communication system to which the present invention is applicable. The wireless communication system can also be called an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
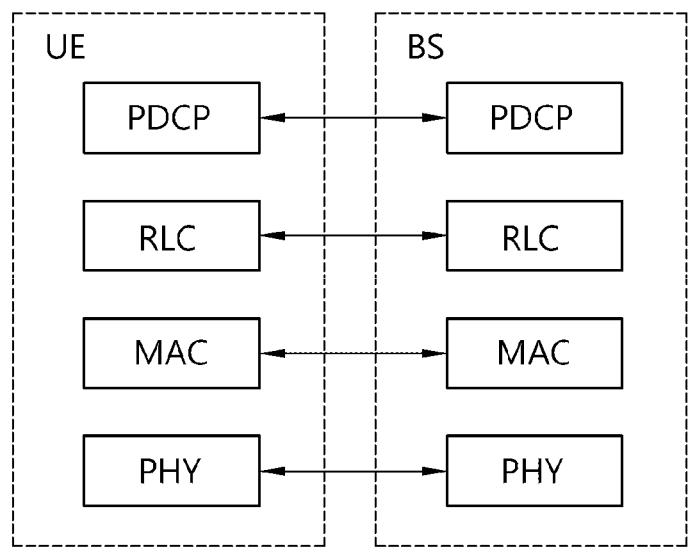
FIG. 2 is a diagram showing a radio protocol architecture for a user plane.
Figure 3:
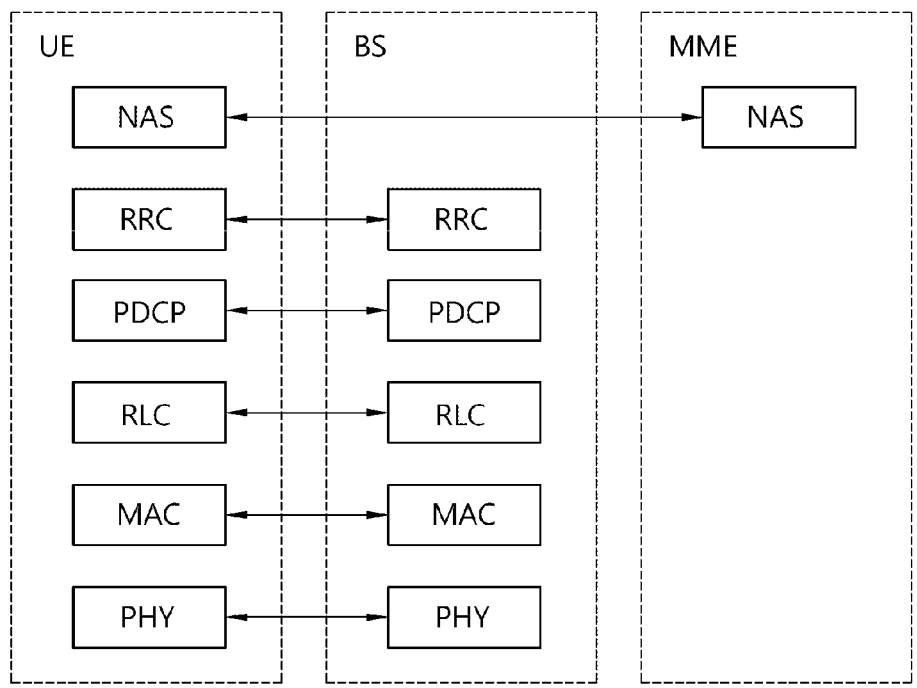
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The data plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A function of a packet data convergence protocol (PDCP) layer in the user plane includes user data delivery, header compression, and ciphering. A function of a PDCP layer in the user plane includes control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC_CONNECTED state, and otherwise the UE is in an RRC_IDLE state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC_CONNECTED state, and if the two layers are not connected to each other, it is called an RRC_IDLE state. When in the RRC_CONNECTED state, the UE has an RRC connection and thus the E-UTRAN can recognize a presence of the UE in a cell unit. Accordingly, the UE can be effectively controlled.

On the other hand, when in the RRC_IDLE state, the UE cannot be recognized by the E-UTRAN, and is managed by a core network (CN) in a tracking area unit which is a unit of a wider area than a cell. That is, regarding the UE in the RRC_IDLE state, only a presence or absence of the UE is recognized in a wide area unit. To receive a typical mobile communication service such as voice or data, a transition to the RRC_CONNECTED state is necessary.

When a user initially powers on the UE, the UE first searches for a proper cell and thereafter stays in the RRC_IDLE state in the cell. Only when there is a need to establish an RRC connection, the UE staying in the RRC_IDLE state establishes the RRC connection with the E-UTRAN through an RRC connection procedure and then transitions to the RRC_CONNECTED state. Examples of a case where the UE in the RRC_IDLE state needs to establish the RRC connection are various, such as a case where uplink data transmission is necessary due to a user's call attempt or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successful, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Next, system information will be described.

The system information includes necessary information that must be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, the UE recognizes a cell type differently according to which service can be provided. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network vender, and a cell can be used only by the network vender and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a normal service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

The following description is related to measurement and measurement reporting.

It is necessary for a mobile communication system to support a mobility of a UE. Therefore, the UE persistently measures quality of a serving cell providing a current service and quality of a neighbor cell. The UE reports a measurement result to a network at a proper time. The network provides an optimal mobility to the UE by using a handover or the like.

To provide information which can be helpful for a network operation of a vender in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, a mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication vender may perform a network operation by using a plurality of frequency bands. If a service of a communication system is provided by using the plurality of frequency bands, an optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, the RAT may include a GMS EDGE radio access network (GERAN) and a UMTS terrestrial radio access network (UTRAN) conforming to the 3GPP standard, and may also include a CDMA 2000 system conforming to the 3GPP2 standard.

Figure 4:
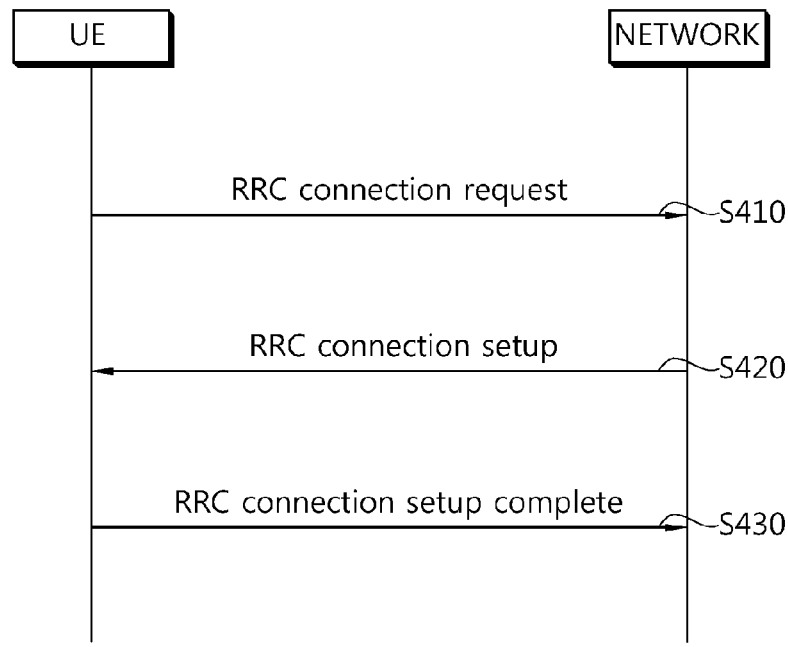
FIG. 4 is a flowchart showing a radio resource control (RRC) connection establishment procedure.

FIG. 4 is a flowchart showing an RRC connection establishment procedure.

A UE sends to a network an RRC connection request message for requesting an RRC connection (step S410). The network sends an RRC connection setup message in response to the RRC connection request (step S420). After receiving the RRC connection setup message, the UE enters an RRC connected mode.

The UE sends to the network an RRC connection setup complete message used to confirm successful completion of the RRC connection establishment (step S430).

RRC connection reestablishment is performed similarly to RRC connection establishment. The RRC connection reestablishment is an operation of reestablishing an RRC connection, and is related to a restart of an SRB1 operation, a reactivation of security, and a configuration of a primary cell (PCell). The UE sends to the network an RRC connection reestablishment request message for requesting the RRC connection reestablishment. The network sends an RRC connection reestablishment message in response to the RRC connection reestablishment request. The UE sends an RRC connection reestablishment complete message in response to the RRC connection reestablishment.

Figure 5:
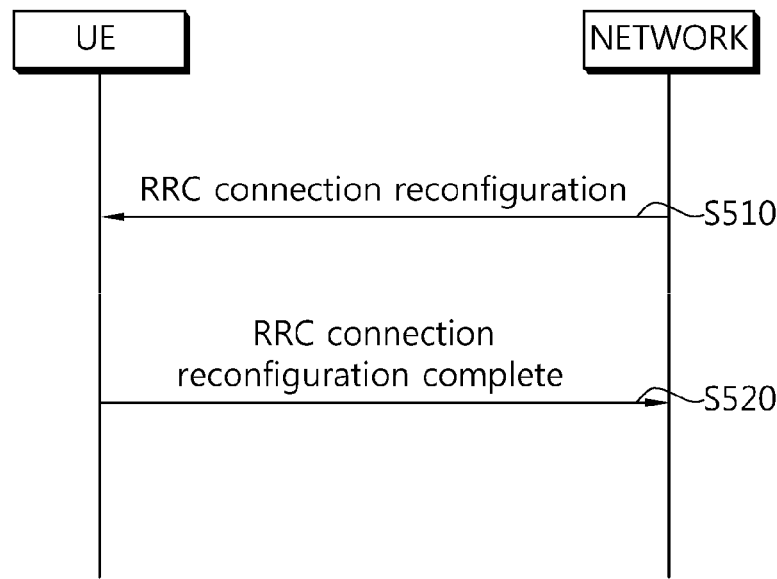
FIG. 5 is a flowchart showing an RRC connection reconfiguration procedure.

FIG. 5 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S510). In response to the RRC connection reconfiguration, the UE sends to the network an RRC connection reconfiguration complete message used to confirm successful completion of the RRC connection reconfiguration (step S520).

Figure 6:
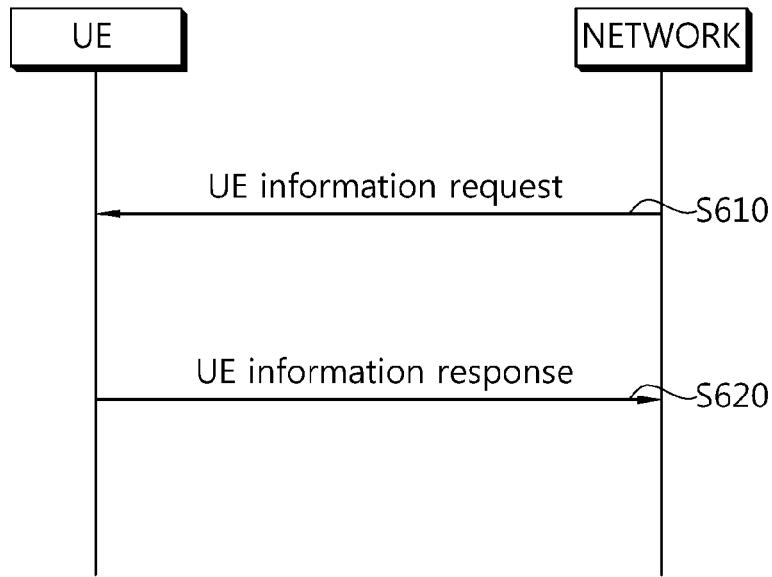
FIG. 6 is a flowchart showing a user equipment information reporting procedure.

FIG. 6 is a flowchart showing a UE information reporting procedure.

A network sends to a UE a UE information request message for obtaining UE information (step S610). The UE information request message includes a field for indicating whether the UE will report information on a random access process and/or a radio link failure. The UE information request message includes a field for indicating whether the UE will report a logged measurement.

The UE sends to the network a UE information response message including information requested by the UE information request (step S620).

Now, minimization of driving tests (MDT) will be described.

The MDT is performed by venders for coverage optimization by using a UE instead of using an automobile. The coverage varies depending on a location of a BS, deployment of buildings nearby, a user's usage environment, etc. Therefore, it is required for the vender to periodically perform the driving test, and a lot of costs and resources are consumed. The MDT is used by the vender to optimize a network by using the UE.

The MDT can be classified into a logged MDT and an immediate MDT. According to the logged MDT, after performing the MDT measurement, the UE delivers a logged measurement to a network at a particular time. According to the immediate MDT, after performing the MDT measurement, the UE delivers the measurement to the network when a reporting condition is satisfied. The logged MDT performs the MDT measurement in an RRC idle mode, and the immediate MDT performs the MDT measurement in an RRC connected mode.

Figure 7:
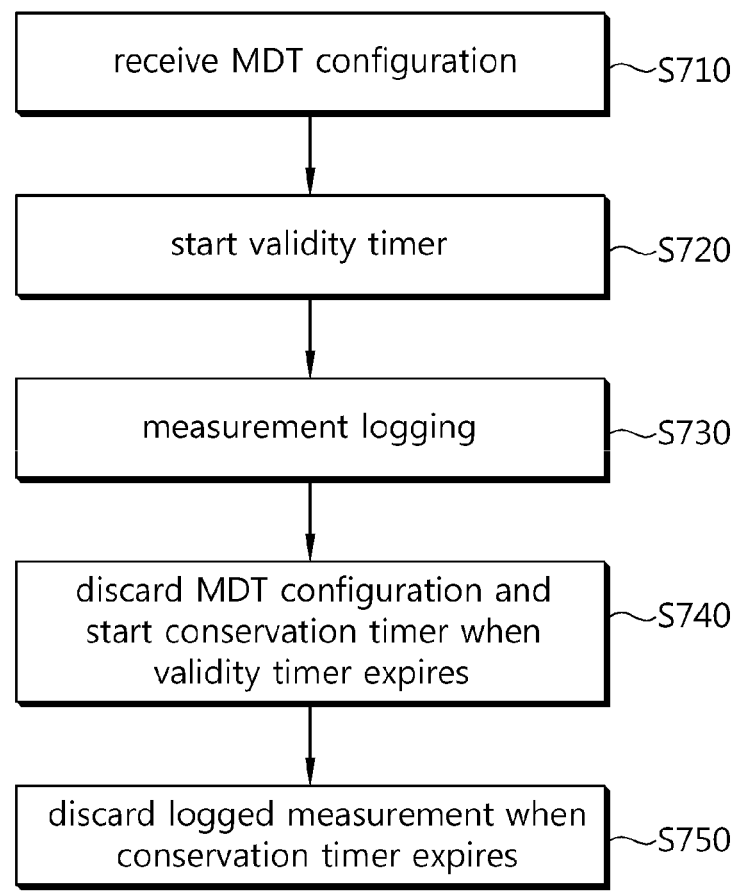
FIG. 7 shows a process of performing the conventional minimization of driving tests (MDT).

FIG. 7 shows a process of performing the conventional MDT.

A UE receives an MDT configuration from a network (step S710). The UE is in an RRC connected mode in which an RRC connection is established with a serving cell. Even if the RRC mode transitions to an RRC idle mode, the MDT configuration is maintained, and thus an MDT measurement result is also maintained.

The MDT configuration may include at least one of a logging interval, a reference time, and an area configuration. The logging interval indicates an interval for storing the measurement result. The reference time is used to report the reference time when the UE sends the logged measurement. The area configuration indicates an area requested to perform logging by the UE.

Upon receiving the MDT configuration, the UE starts a validity timer (step S720). The validity timer indicates a lifetime of the MDT configuration. The validity timer may be included in the MDT configuration. This value is called a logging duration. When the UE receives the MDT configuration, the UE sets a value of the validity timer to the logging duration, and then starts the validity timer.

The UE transitions to an RRC idle mode, and logs measurements on the basis of the MDT configuration while the validity timer is running (step S730). For example, the MDT measurement is performed in every logging interval included in the MDT configuration. An MDT measurement value may be a value well-known to those ordinarily skilled in the art, such as reference signal received power (RSRP), reference signal received quality (RSRQ), received signal code power (RSCP), and Ec/No.

The logging of the MDT measurement performed by the UE on the basis of the MDT configuration may vary depending on a location at which the UE exists.

Figure 8:
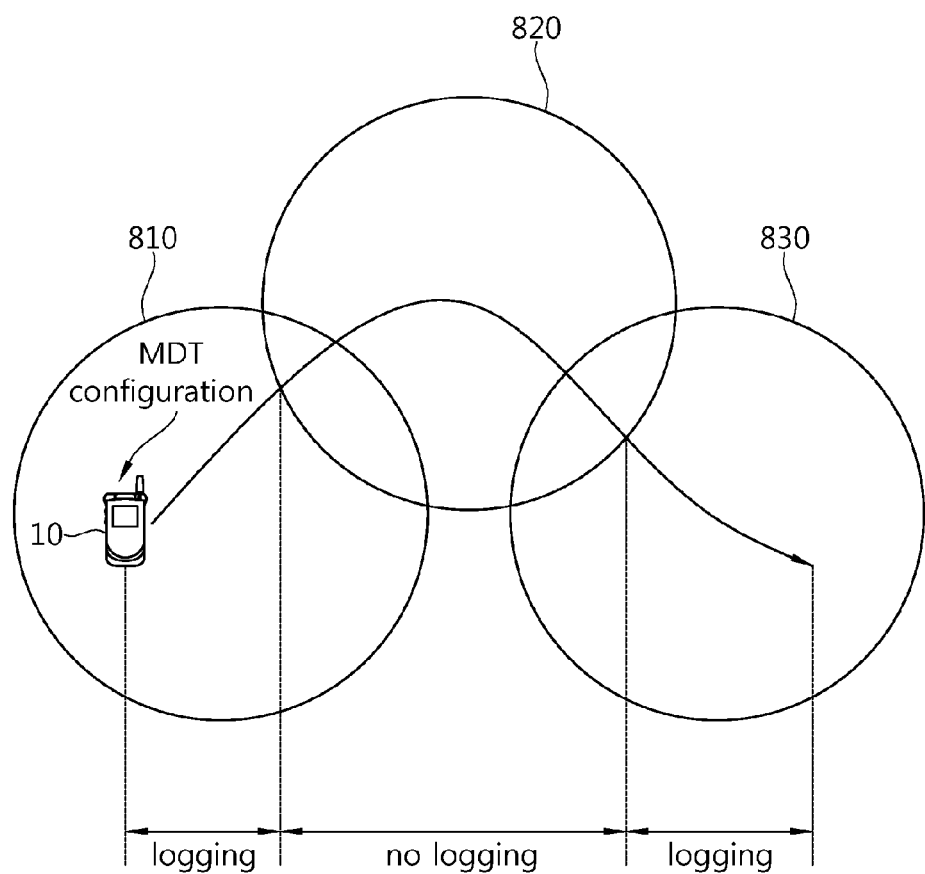
FIG. 8 shows an example of an MDT measurement based on a logging area.

FIG. 8 shows an example of an MDT measurement based on a logging area.

A network may set a logging area which is an area that must be logged by a UE. The logging area may be expressed in a cell list or a tracking area/location area list. If the logging area is set to the UE, MDT measurement logging stops when the UE is out of the logging area.

A first area 810 and a third area 830 are areas which are set to logging areas, and a second area 820 is an area in which logging is not allowed. The UE performs logging in the first area 810, but does not perform MDT measurement logging in the second area 820. When the UE moves from the second area 820 to the third area 830, MDT measurement logging is performed again.

Figure 9:
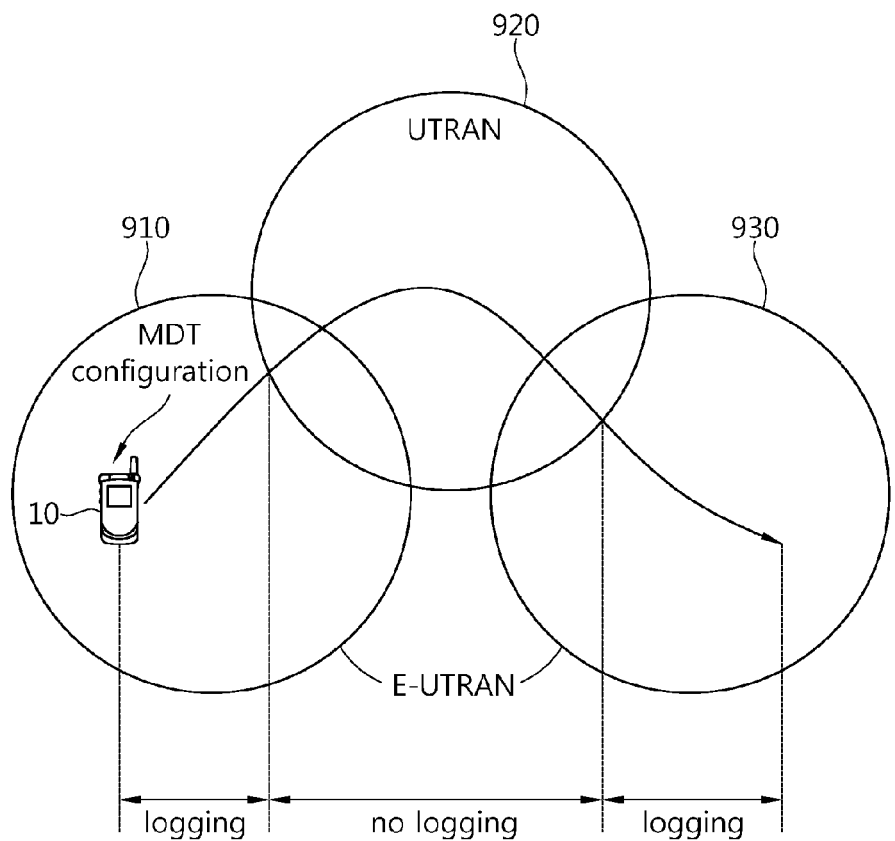
FIG. 9 shows an example of an MDT measurement based on a radio access technology (RAT) change.

FIG. 9 shows an example of an MDT measurement based on an RAT change.

A UE performs logging only when camped on an RAT in which an MDT configuration is received, and stops logging in other RATs. However, the UE can perform logging on cell information of another RAT other than the RAT on which the UE camps.

A first area 910 and a third area 930 are E-UTRAN areas, and a second area 920 is a UTRAN area. The MDT configuration is received from the E-UTRAN. When the UE enters the second area 920, the MDT measurement is not performed.

Returning to FIG. 7, at the expiry of the validity timer, the UE discards the MDT configuration, and starts a conservation timer (step S740). The UE removes the MDT configuration and stops the MDT measurement. However, the logged measurement is maintained. The conservation timer indicates a lifetime of the logged measurement.

At the expiry of the conservation timer, the logged measurement is discarded (step S750). When a request of reporting the logged measurement is received from a BS while the conservation timer is running, the UE may report the logged measurement.

The conservation timer may have a fixed value. For example, the value of the conservation timer may be 48 hours. Alternatively, the value of the conservation timer may be included in the MDT configuration and may be reported by the BS to the UE.

Upon receiving a new MDT configuration, the previous MDT configuration is updated to the new MDT configuration, and the validity timer restarts. In addition, the logged MDT measurement is discarded according to the previously determined MDT configuration.

If the logged MDT measurement exists, whether the logged measurement is available may be transmitted to the BS when the UE transitions from the RRC idle mode to the RRC connected mode. The UE may transmit an availability indicator to the network when the RRC connection is established, when the RRC connection is reestablished, and when the RRC connection is reconfigured. In addition, if the UE is handed over, a handover complete message may be transmitted to the network by including the availability indicator indicating that the logged MDT measurement exists in a handover target cell.

Upon receiving the presence of the logged MDT measurement from the UE, the network may request the UE to transmit the logged MDT measurement. When the network knows that there is the logged measurement, the network sends to the UE an information request for requesting a report of the logged measurement. The UE sends to the network an information response including the logged measurement.

Contents measured by the UE during the MDT measurement are performed are mainly related to a wireless environment. The MDT measurement may include a cell identifier, cell's signal quality and/or signal strength. The MDT measurement may include a measurement time and a measurement place.

Figure 10:
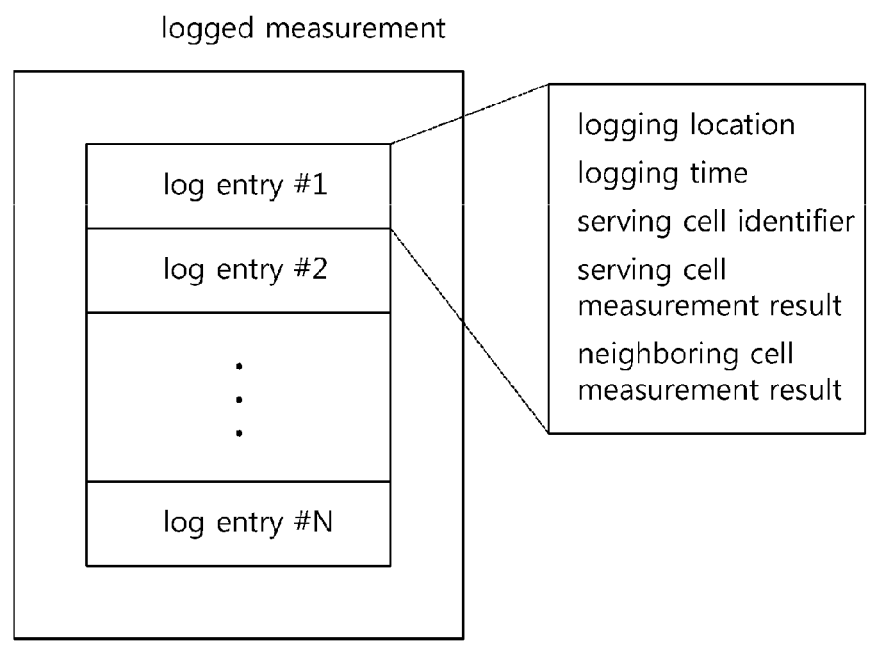
FIG. 10 shows an example of a logged measurement.

FIG. 10 shows an example of a logged measurement.

The logged measurement includes one or more log entries.

The log entry includes a logging location, a logging time, a serving cell identifier, a serving cell measurement result, and a neighboring cell measurement result.

The logging location indicates a location measured by a UE. The logging time indicates a time measured by the UE. Information logged at a different logging time is stored in a different log entry.

The serving cell identifier may include a cell identifier in a layer 3, and is called a global cell identity (GCI). The CGI is a group of a physical cell identity (PCI) and a PLMN identifier.

A primary purpose of logging and reporting of the MDT measurement is to create a coverage map having a good granularity on the basis of exchanging of reports from UEs. In a logging method, the granularity of the coverage map may depend on a mobility of the UE, such as a speed. If the UE moves faster, a movement distance of the UE may become longer between consecutive logging intervals. As a result, the granularity of the coverage map is further decreased. On the other hand, if the UE moves more slowly, the movement distance of the UE becomes shorter between the consecutive logging intervals, which results in an increase in the granularity of the coverage map.

A change in the UE speed during the logging interval results in a change of the granularity of the coverage map created by the logging results of the UE according to a location. In particular, a low granularity caused by a high UE speed may be a problem. This is because logging related to a coverage hole may include location and timing information closely related to the coverage hole. Further, a coverage hole which actually exists may be determined as being absent. If the logging is performed by a UE which moves at a very low speed, a log can be configured with the same information in every logging interval. Such logs are not useful to create the coverage map.

Therefore, a method of performing an MDT measurement and logging by adjusting a logging interval according to a UE mobility will be described hereinafter according to an embodiment of the present invention. Hereinafter, the method of performing an MDT measurement and logging can be applied to the conventional MDT measurement method of FIG. 7.

Figure 11:
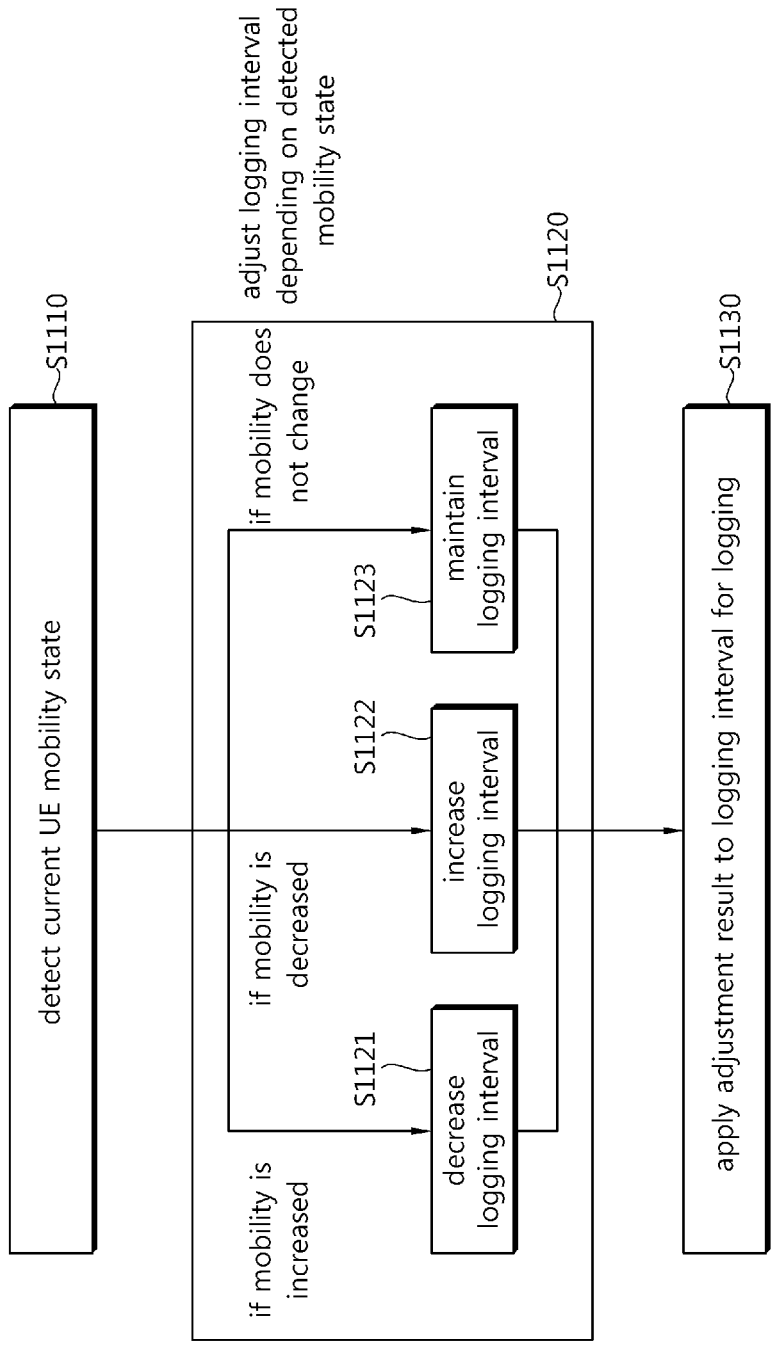
FIG. 11 shows a method of adjusting a logging interval according to an embodiment of the present invention.

FIG. 11 shows a method of adjusting a logging interval according to an embodiment of the present invention.

Referring to FIG. 11, a UE detects a current mobility state (step S1110).

The UE adjusts a logging interval according to the detected mobility state (step S1120). If a UE mobility is increased similarly to a case where a UE speed becomes faster than before, the logging interval is decreased (step S1121). If the UE mobility is decreased similarly to a case where the UE speed becomes slower than before, the logging interval is increased (step S1122). If there is no change in the UE mobility, the logging interval is not changed (step S1123).

The UE applies the adjustment result to the logging interval for logging (step S1130).

Figure 12:
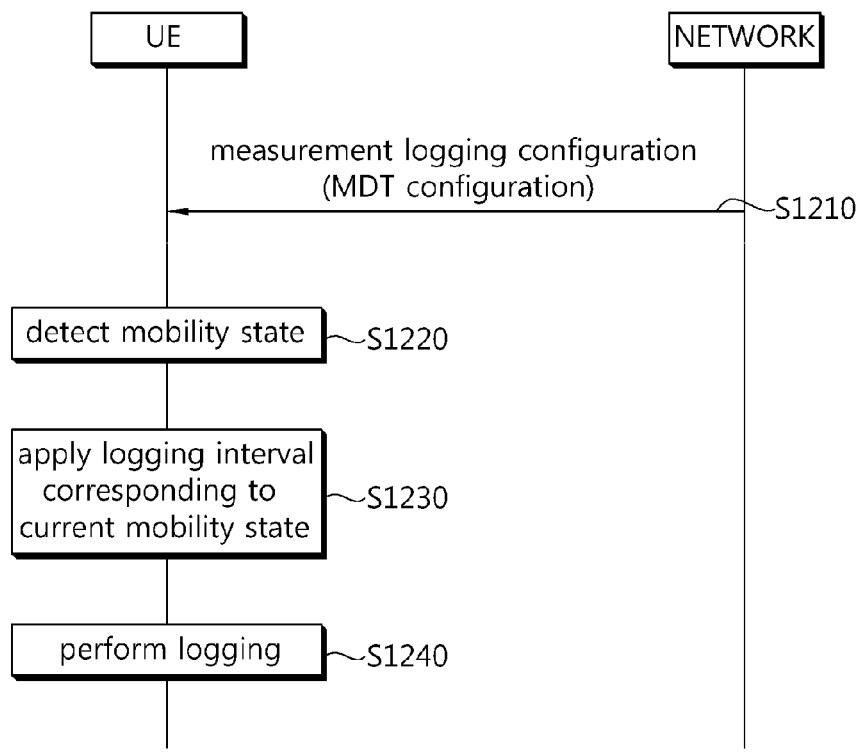
FIG. 12 shows an example of an MDT measurement method based on a user equipment mobility according to an embodiment of the present invention.

FIG. 12 shows an example of an MDT measurement method based on a UE mobility according to an embodiment of the present invention.

Referring to FIG. 12, a network transmits a measurement logging configuration to a UE to instruct to perform a measurement logging task (step S1210). The measurement logging configuration may be an MDT configuration transmitted by the network to the UE. It is assumed in the following description that the measurement logging configuration is the MDT configuration.

The MDT configuration includes a parameter related to the measurement logging task (i.e., the existing parameter including the logging interval) and a parameter for logging interval adjustment depending on the UE mobility. After receiving the measurement logging configuration from the network, the UE enters an RRC_IDLE state and then exists in a logging-enabled state.

To determine an initial logging interval, the UE detects its mobility state (step S1220). Information on the mobility state may be included in the MDT configuration transmitted by the network to the UE. The mobility state may be determined according to a criterion determined by the network or the UE itself. For example, the UE mobility may be determined according to a criterion of a speed range of the UE.

The UE 1210 applies a logging interval corresponding to the current mobility state (step S1230).

If the current UE mobility is a normal mobility, the UE applies a logging interval received by using the MDT configuration. If the current UE mobility is an intermediate mobility, the UE applies a logging interval corresponding to the intermediate mobility. If the current UE mobility is a high mobility, the UE applies a logging interval corresponding to the high mobility. Hereinafter, a method of determining a logging interval corresponding to a UE mobility state will be described.

1. A scaling parameter corresponding to each of other mobilities except for the normal mobility is included as an additional parameter for logging interval adjustment in the MDT configuration. If a scaling parameter corresponding to the intermediate mobility is denoted by SF_medium and a scaling parameter corresponding to the high mobility is denoted by SF_high, the UE can schedule the logging interval according to its mobility state as described below.

1) If the UE mobility state is the normal mobility, a new logging interval can be set to a logging interval value in the MDT configuration transmitted by the network.

2) If the UE mobility state is the high mobility, the new logging interval can be set to a value obtained by multiplying SF_high by the logging interval value in the MDT configuration transmitted by the network.

3) If the UE mobility state is the intermediate mobility, the new logging interval can be set to a value obtained by multiplying SF_medium by the logging interval value in the MDT configuration transmitted by the network.

The aforementioned first embodiment can be properly applied to a case where the UE mobility is increased. However, since a scheduling parameter for a case where the UE mobility is decreased is not defined, it is difficult to apply to the logging interval adjustment. If a coverage map having an excessively high granularity is created due to a low UE mobility, a logged MDT measurement result becomes unnecessarily great, which may cause inefficiency. Therefore, in this case, a scheduling parameter SF_low can be additionally defined and applied so that a new logging interval can be increased.

Although the scaling parameter is provided by dividing the mobility state into two cases, i.e., the intermediate mobility and the high mobility in the aforementioned first embodiment, this is for exemplary purposes only. Thus, the scaling parameter can also be provided by dividing the mobility state more specifically or more roughly.

In the aforementioned first embodiment, the scaling parameters may have a relation of:

0<SF_high<SF_medium<1<SF_low.

2. A logging interval value corresponding to each of other mobility states except for a case where the UE mobility state is the normal mobility is included as an additional parameter for logging interval adjustment in the MDT configuration. In other words, a logging interval for the intermediate mobility (i.e., LoggingInterval_medium) and a logging interval for the high mobility (i.e., LoggingInterval_high) are included in the MDT configuration in addition to a basic logging interval.

1) If the UE mobility state is the normal mobility, the UE performs MDT measurement logging by directly using the existing logging interval.

2) If the UE mobility state is the high mobility, the UE sets LoggingInterval_high as a new logging interval and performs MDT measurement logging by using the adjusted logging interval.

3) If the UE mobility state is the intermediate mobility, the UE sets LoggingInterval_medium as the new logging interval and performs MDT measurement logging by using the adjusted logging interval.

In the aforementioned second embodiment, since an adjusted logging interval value is not defined for a case where the UE mobility is decreased, it is difficult to be applied to logging interval adjustment. In this case, a new logging interval for the low mobility (i.e., LogginInterval_low) can be additionally defined and used.

Although the adjusted logging interval is provided by dividing the mobility state into two cases, i.e., the intermediate mobility and the high mobility in the aforementioned embodiment, this is for exemplary purposes only. Thus, the adjusted logging interval can also be provided by dividing the mobility state more specifically or more roughly.

3. In a case where the UE can more accurately measure its speed by using a global navigation satellite system (GNSS) or the like, the logging interval can be adjusted according to a measured UE speed. In this case, the MDT configuration includes a reference logging distance. The logging interval of the UE can be adjusted as a 'reference logging distance/measured UE speed'.

In the aforementioned embodiment, the logging interval of the UE is decreased when the UE mobility is increased similarly to a case where a speed is increased. On the other hand, the logging interval is increased if the UE mobility is decreased similarly to a case where the speed is decreased. In addition, since the logging interval is adjusted according to the measured UE speed, the granularity of the coverage map may be uniform across locations in comparison with the aforementioned first and second embodiments.

Returning to FIG. 12, the UE 1210 performs logging by applying the logging interval adjusted in step S1230 (step S1240).

If the UE has a low mobility, the logging interval is adjusted to be long so that logging is performed less frequently than before. Otherwise, if the UE has a high mobility, the logging interval is adjusted to be short so that logging is performed more frequently than before.

Figure 13:
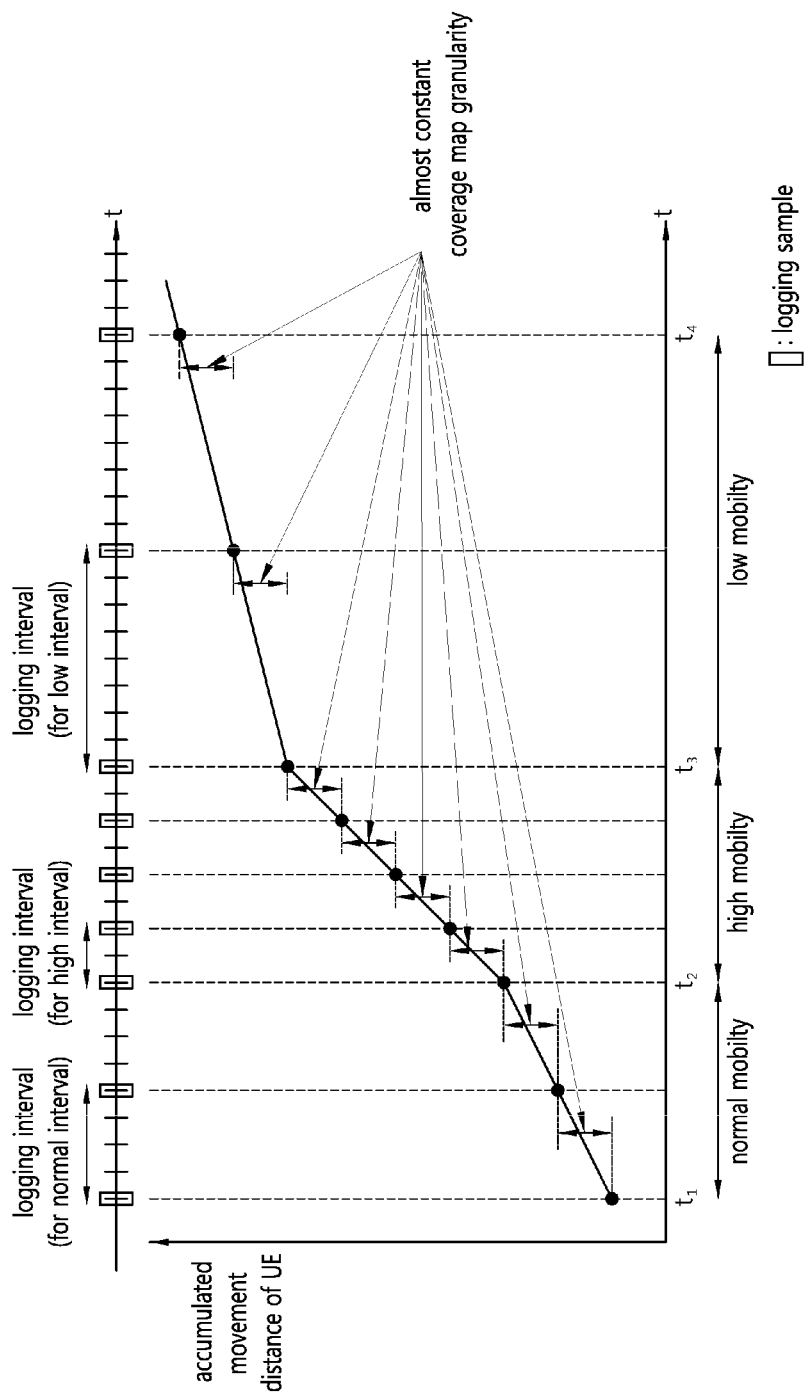
FIG. 13 shows a characteristic of a granularity of a coverage map based on a logged MDT measurement according to an embodiment of the present invention.

FIG. 13 shows a characteristic of a granularity of a coverage map based on a logged MDT measurement according to an embodiment of the present invention.

Referring to FIG. 13, a duration of $t_1 \sim t_2$ corresponds to a normal mobility duration. Herein, a normal mobility does not mean that a UE speed is within a specific range. In the present embodiment, the normal mobility means a reference value of mobility. In the duration of $t_1 \sim t_2$, a UE performs logging by directly using the existing logging interval.

The UE mobility is increased around at a time point $t_2$. The duration of $t_2 \sim t_3$ corresponds to a high mobility duration. Therefore, the UE performs logging by adjusting the logging interval to be shorter than that of the normal mobility duration.

The UE mobility is decreased around at a time point $t_3$. The duration of $t_3 \sim t_4$ corresponds to a low mobility duration. Therefore, the UE performs logging by adjusting the logging interval to be longer than that of the normal mobility duration.

A movement distance of the UE between logging samples as a result of logging performed by the UE is almost constant irrespective of a change in a UE mobility state. As such, when logging is performed by adjusting the logging interval according to the UE mobility, a coverage map having a uniform granularity can be obtained.

Figure 14:
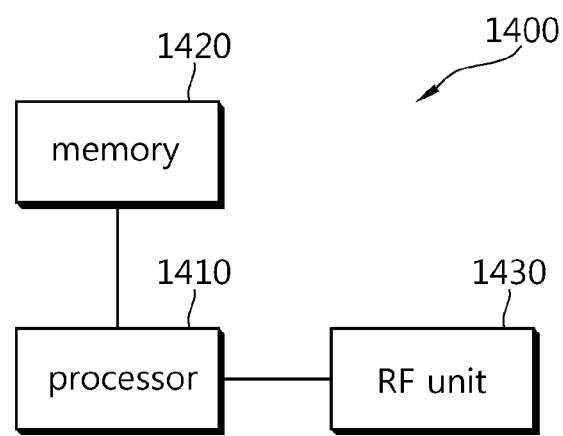
FIG. 14 is a block diagram showing a wireless apparatus according to an embodiment of the present invention.

FIG. 14 is a block diagram showing a wireless apparatus according to an embodiment of the present invention. The apparatus implements operations of a UE according to the embodiments of FIG. 7 to FIG. 13.

A wireless apparatus 1400 includes a processor 1410, a memory 1420, and a radio frequency (RF) unit 1430. The processor 1410 implements the proposed functions, procedures, and/or methods. The processor 1410 transitions between an RRC connected mode and an RRC idle mode, and measures a logged MDT based on an MDT configuration. The processor 1410 detects a mobility, and adjusts a logging interval on the basis of the detected mobility. The processor 1410 measures the logged MDT by using the adjusted interval. The memory 1420 coupled to the processor 1410 stores the MDT configuration and the logged measurement. The embodiments of FIG. 7 to FIG. 13 can be determined by the processor 1410 and the memory 1420.

The RF unit 1430 coupled to the processor 1410 transmits and receives a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method of performing a logged measurement in a wireless communication system, the method comprising:
receiving by a user equipment a measurement configuration from a network, wherein the measurement configuration comprises a logging interval;

detecting by the user equipment a mobility state of the user equipment;

adjusting by the user equipment the logging interval on the basis of the detected mobility state; and logging by the user equipment a measurement by using the adjusted logging interval.

2. The method of claim 1, wherein the measurement configuration further comprises at least one scaling parameter corresponding to the mobility state.

3. The method of claim 2, wherein the adjusting of the logging interval comprises, if the mobility state is changed, determining the adjusted logging interval to a value obtained by multiplying the logging interval by the scaling parameter corresponding to the detected mobility state.

4. The method of claim 1, wherein the measurement configuration further comprises at least one new logging interval corresponding to the mobility state.

5. The method of claim 4, wherein the adjusting of the logging interval comprises, if the mobility state is changed, determining the adjusted logging interval to a new logging interval corresponding to the detected mobility state.

6. The method of claim 1, wherein the measurement configuration further comprises a reference logging distance used as a criterion for adjusting the logging interval.

7. The method of claim 6, wherein the detecting of the mobility state of the user equipment comprises acquiring information on a movement speed of the user equipment.

8. The method of claim 7, wherein the adjusting of the logging interval comprises determining the adjusted logging interval to a value obtained by dividing the reference logging distance by the movement speed of the user equipment.

9. The method of claim 1, further comprising:

receiving a report request of the logged measurement by the user equipment from the network; and transmitting a measurement result comprising the logged measurement by the user equipment to the network in response to the report request.

10. A wireless apparatus performing a logged measurement in a wireless communication system, comprising:

a radio frequency (RF) unit for transmitting and receiving a radio signal; and a processor coupled to the RF unit, wherein the processor is configured for:

receiving a measurement configuration from a base station, wherein the measurement configuration comprises a logging interval;

detecting a mobility state of the user equipment;

adjusting the logging interval on the basis of the detected mobility state; and logging a measurement by using the adjusted logging interval.

11. The wireless apparatus of claim 10, wherein the measurement configuration further comprises at least one scaling parameter corresponding to the mobility state, and wherein the adjusting of the logging interval comprises, if the mobility state is changed, determining the adjusted logging interval to a value obtained by multiplying the logging interval by the scaling parameter corresponding to the detected mobility state.

12. The wireless apparatus of claim 10, wherein the measurement configuration further comprises at least one new logging interval corresponding to the mobility state, and wherein the adjusting of the logging interval comprises, if the mobility state is changed, determining the adjusted logging interval to a new logging interval corresponding to the detected mobility state.

13. The wireless apparatus of claim 10, wherein the measurement configuration further comprises a reference logging distance used as a criterion for adjusting the logging interval.

14. The wireless apparatus of claim 13, wherein the detecting of the mobility state of the user equipment comprises acquiring information on a movement speed of the user equipment, and wherein the adjusting of the logging interval comprises determining the adjusted logging interval to a value obtained by dividing the reference logging distance by the movement speed of the user equipment.

* * * * *